United States Patent [19]

Nakanishi et al.

[11] Patent Number: 5,017,225

[45] Date of Patent: May 21, 1991

[54] MICROENCAPSULATED PHOTOCHROMIC MATERIAL, PROCESS FOR ITS PREPARATION AND A WATER-BASE INK COMPOSITION PREPARED THEREFROM

[75] Inventors: Masayuki Nakanishi; Takashi Iwasaki, both of Kanagawa; Shuichi Maeda, Saitama, all of Japan

[73] Assignees: Japan Capsular Products Inc.; Mitsubishi Kasei Corporation, both of Japan

[21] Appl. No.: 392,913

[22] PCT Filed: Dec. 1, 1988

[86] PCT No.: PCT/JP88/01215

§ 371 Date: Jul. 27, 1989

§ 102(e) Date: Jul. 27, 1989

[87] PCT Pub. No.: WO89/05335

PCT Pub. Date: Jun. 15, 1989

[30] Foreign Application Priority Data

| Dec. 2, 1987 [JP] | Japan | 62-305082 |
| Oct. 19, 1988 [JP] | Japan | 63-263303 |
| Oct. 19, 1988 [JP] | Japan | 63-263304 |
| Oct. 19, 1988 [JP] | Japan | 63-263306 |

[51] Int. Cl.$^5$ .................. C09D 11/00; B41M 5/165

[52] U.S. Cl. .................. 106/21; 430/138; 428/402.2; 503/214; 503/215

[58] Field of Search .................. 106/21; 430/138; 428/402.2; 503/214, 215

[56] References Cited

U.S. PATENT DOCUMENTS

| 4,132,436 | 1/1979 | Ishige et al. | 106/21 |
| 4,727,140 | 2/1988 | Meisel et al. | 544/92 |
| 4,766,211 | 8/1988 | Zink et al. | 544/74 |
| 4,816,584 | 3/1989 | Kwak et al. | 544/71 |
| 4,909,963 | 3/1990 | Kwak et al. | 544/71 |

Primary Examiner—Mark L. Bell
Assistant Examiner—Helene Klemanski
Attorney, Agent, or Firm—Jordan B. Bierman

[57] ABSTRACT

This invention relates to a microencapsulated photochromic material and a process for its preparation. More particularly, it relates to a microencapsulated photochromic material having a good durability and a process for its preparation.

The present invention further relates to a water-base ink composition comprising said microencapsulated photochromic material.

10 Claims, No Drawings

MICROENCAPSULATED PHOTOCHROMIC MATERIAL, PROCESS FOR ITS PREPARATION AND A WATER-BASE INK COMPOSITION PREPARED THEREFROM

DESCRIPTION

1. Technical Field

This invention relates to a microencapsulated photochromic material and a process for its preparation. More particularly, it relates to a microencapsulated photochromic material having a good durability and a process for its preparation.

The present invention further relates to a water-base ink composition comprising said microencapsulated photochromic material.

2. Background Art

Known photochromic compounds include silver halide of inorganic matters, sodalite, organic anils, spiropyranes, spirooxazines, metal cytidionates, phenothiazines, phenodins and Bianthrones. Among these materials, spirooxazine compounds are particularly excellent in the repeated coloring/decoloring response. However these compounds should be protected from oxygen, toxic vapors and toxic rays in the air in order to retain the rapid coloring/decoloring reversibility, color tone and color density for a long time. Accordingly conventional methods for the preparation of photochromic materials required highly complicated procedures, for example, dispersing a spirooxazine compound in a resin material and further laminating a thick plastic film thereon to thereby protect it; or dispersing the spirooxazine compound in a resin material, hardening and grinding the dispersion followed by coating it with an inorganic protective material. Thus a conventional photochromic material comprising a spirooxazine compound requires a complicated procedure for the production, which makes it expensive. Further it has another disadvantage, namely, a poor durability.

3. Disclosure of the Invention

The present invention relates to a microencapsulated photochromic material wherein a spirooxazine compound is microencapsulated in the form of a solution.

Now the microencapsulated photochromic material of the present invention will be described in detail.

An example of the spirooxazine compound to be used is the one represented by the following general formula [I]:

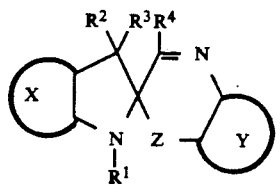

[I]

wherein $R^1$, $R^2$ and $R^3$ represent each an optionally substituted alkyl group, an optionally substituted alkenyl group, a cycloalkyl group or an aryl group;

$R^2$ and $R^3$ may bind to each other to thereby form a ring;

$R^4$ represents a hydrogen atom or an alkyl group having 1 to 5 carbon atoms;

$R^1$ may have another spirooxazine ring via an alkylene or arylene group to thereby give a dimeric compound as the whole;

X and Y represent each an optionally substituted hydrocarbon aromatic ring or heterocyclic aromatic ring; and Z represent an oxygen atom or a sulfur atom.

Examples of the $R^1$, $R^2$ and $R^3$ groups in the compound represented by the above formula [I] include optionally substituted alkyl groups such as alkyl groups such as those having 1 to 28 carbon atoms, alkoxyalkyl groups such as methoxyethyl and ethoxyethyl group, alkoxyalkoxyalkyl groups such as methoxyethoxyethyl and n-butoxyethoxyethyl groups, alkoxyalkoxyalkoxyalkyl groups such as methoxyethoxyethoxyethyl and ethoxyethoxyethoxyethyl groups, optionally substituted aryloxyalkyl groups such as phenyloxyethyl, naphthyloxyethyl and p-chlorophenyloxyethyl groups, optionally substituted arylalkyl groups such as benzyl, phenethyl, p-chlorobenzyl and p-nitrobenzyl groups, cycloalkylalkyl groups such as cyclohexylmethyl, cyclohexylethyl and cyclopentylmethyl group, optionally substituted alkenyloxyalkyl groups such as allyloxyethyl and 3bromoallyloxyethyl groups, cyanoalkyl groups such as cyanoethyl and cyanomethyl groups, hydroxylalkyl groups such as hydroxyethyl and hydroxymethyl groups; tetrahydrofurylalkyl groups such as tetrahydrofurfuryl and tetrahydrofurylethyl groups, optionally substituted alkenyl groups such as allyl and 2-chloroallyl groups, optionally substituted aryl groups such as phenyl, p-methylphenyl, naphthyl and m-methoxyphenyl groups and cycloalkyl groups such as cyclohexyl and cyclopentyl groups. $R^2$ and $R^3$ may bind to each other to thereby form a cycloalkyl group such as cyclohexyl, cyclopentyl or cycloheptyl group. Further $R^1$ may be another spirooxazine ring bound via an alkyulene or arylene group to thereby form a dimeric compound as the whole. Examples of $R^4$ include a hydrogen atom and alkyl groups having 1 to 5 carbon atoms such as methyl and ethyl groups.

Examples of the optionally substituted hydrocarbon aromatic rings or heterocyclic aromatic rings X and Y include benzene, naphthalene, quinoline and phenanthrene rings. These rings may be substituted with, for example, halogen atoms such as chlorine, bromine and iodine atoms, alkyl groups having 1 to 6 carbon atoms, alkoxy groups, alkoxycarbonyl groups, alkoxysulfonyl groups such as methoxysulfonyl and ethoxysulfonyl groups, cyano group, amino group, dimethylamino groups and nitro group.

Among the spirooxazine compounds represented by the above formula [I], the one represented by the following general formula [II]:

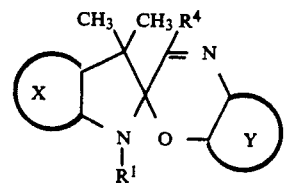

[II]

wherein $R^1$ represents an alkyl group having 1 to 20 carbon atoms or an alkoxyalkyl group;

$R^4$ represents a hydrogen atom or a methyl group; and

X and Y represent each an optionally substituted hydrocarbon aromatic ring or a heterocyclic aromatic ring; may be preferably used in the present invention.

As the solvent to be used in the present invention, those having a boiling point of 40 to 160° C. and a solubility in water at 20° C. of 15% by weight or below are preferable. A solvent having a boiling point lower than the lower limit as defined above is highly volatile, which makes the microencapsulation difficult. On the other hand, a spirooxazine compound is insoluble in a solvent having a boiling point higher than the upper limit as defined above, which might cause the deterioration of the spirooxazine compound. Solvents having a solubility in water exceeding 15% by weight would be dissolved in water. Thus the spirooxazine compound would be suspended, which makes the microencapsulation difficult. Preferable examples of the solvent include ketone solvents such as cyclohexanone and methyl isobutyl ketone; aromatic hydrocarbon ring solvents such as toluene and benzene; halogenated hydrocarbon solvents such as tetrachloroethylene, tetrachloroethane, trichloroethylene and methylene chloride; and ester solvents such as butyl acetate. Among these solvents, methyl isobutyl ketone, cyclohexanone, toluene, benzene and tirchloroethylene are particularly preferable.

The microencapsulated photochromic material of the present invention may be prepared by dissolving a spirooxazine compound in a solvent, which has a boiling point of 40 to 160° C. and a solubility in water at 20° C. of 15% by weight or below, microencapsulating the obtained solution and vaporizing most of the solvent from the capsules during or after said procedure while remaining a trace amount of the solvent.

The microencapsulation may be conducted by various methods including phase separation, interfacial polymerization and drying in a liquid. Among these methods, gelatin phase separation is the most suitable for the microencapsulation of the present invention, since it involves a step for the vaporization of a solvent.

The phase separation comprises using a water soluble polymer as a capsule-wall film forming material and phase separating (coacervating) a thick solution phase of said polymer from the resulting aqueous solution to thereby form a capsule wall. It is commonly called the coacervation method and the coacervate is utilized as the capsule wall. The cocervate may be formed by two methods. One method is called simple coacervation wherein a hydrophilic polymer precipitate is subjected to phase separation by adding a salt, an alcohol or acetone. Another method is called complex coacervation wherein two or more reversely charged hydrophilic polymers occur phase separation by controlling the pH value or diluting with water. The latter method is preferable in practice.

A common production process through coacervation roughly comprises the following three steps:

(1) emulsification or dispersion step;
(2) coacervation step; and
(3) hardening step.

Examples of known insolubilizing (hardening) agents to be used in the abovementioned hardening step 3 include aldehydes, diketones, epoxides, acid anhydrides, acid chlorides, carbodiimides and inorganic salts. Among these materials, dialdehydes are particularly preferable from the viewpoints of hardening rate, color density at irradiation and effects on the light resistance of printed matters. Glutaraldehyde is still preferable.

Although various microcapsule film agents are available in the present invention, gelatin film agents are preferable therefore from the viewpoint of the light resistance and color density of the photochromic material. Among the gelatin film materials, gelatin/gum arabic and gelatin/carboxymethylcellulose film agents are particularly preferable.

In the present invention, the microencapsulation whereby a crosslinked gelatin film is formed may be conducted in the following manner.

In the abovementioned coacervation method, a solution of a spirooxazine compound, which serves as the core of the photochromic material, is first mixed in an aqueous solution of gelatin and then emulsified. Next, the obtained emulsion is mixed with an aqueous solution of, for example, carboxymethylcellulose or gum arabic to thereby induce the complex coacervation. Subsequently a hardening agent in an amount of 5 to 20% by weight, based on the gelatin, is added thereto and the resulting mixture is stirred at a definite period. When an aldehyde is employed as the hardening agent, for example, the stirring may be continued at 5 to 20° C. for 1 to 20 hours.

When the spirooxazine compound is dissolved in the solvent, various additives such as an UV absorber, an antioxidant or a hindered amine stabilizer may be further added in order to improve the light resistance of the microencapsulated photochromic material of the present invention, so long as they would exert no undesirable effect on the coloring. Furthermore, an UV absorber may be incorporated into the capsule wall.

As the UV absorber, those having an effective absorption wavelength of 300 nm or below are preferable. Examples thereof are as follows.

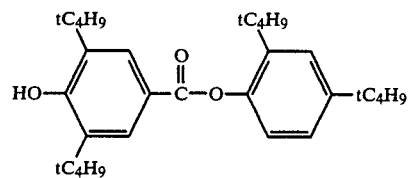

Tradename: Viosorb 80 (Kyodo Yakuhin) or Sumisorb 40 (Sumitomo Chemical)
Effective absorption wavelength: 240-290 nm;

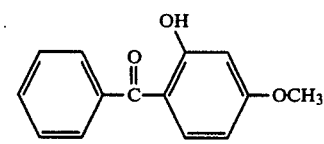

Tradename: Sumisorb 110 (Sumitomo Chemical)
Effective absorption wavelength: 280-300 nm;

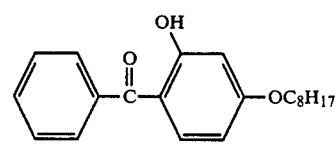

Tradename: Sumisorb 130 (Sumitomo Chemical)
Effective absorption wavelength: 280-300 nm
Among these compounds,

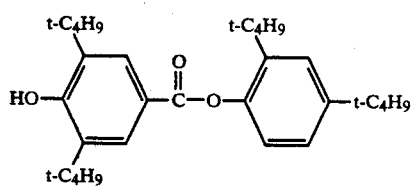

is the most preferable.

On the other hand, examples of the antioxidants are as follows:

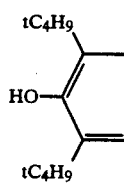

Tradename: Yoshinox BHT (Yoshitomi Seiyaku);

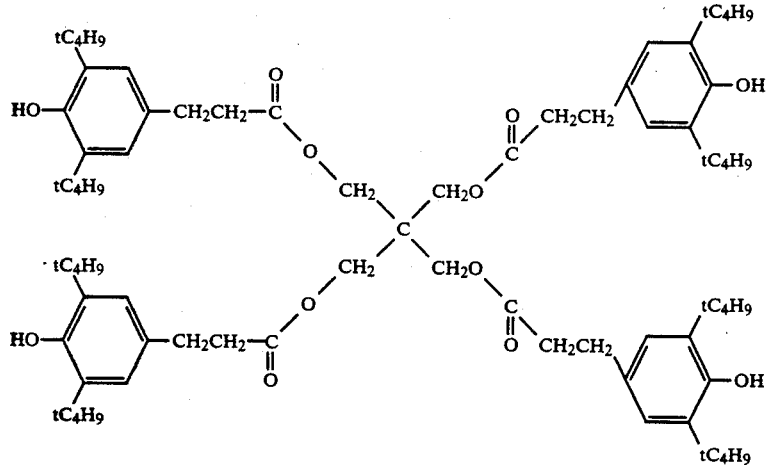

Tradename: Irganox 1010 (Ciba-Geigy);
as well as phosphorus antioxidants such as:

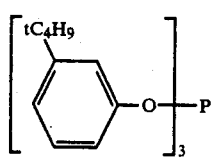

Tradename: Sumilizer TNP (Sumitomo Chemical); and

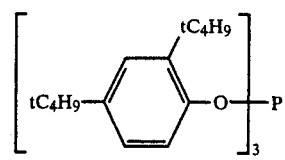

Tradename: Sumilizer P-16 (Sumitomo Chemical).

Examples of particularly preferable hindered amine stabilizers include the following ones:

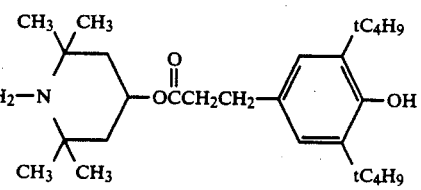

Tradename: Sanol LS-2626 (Sankyo);

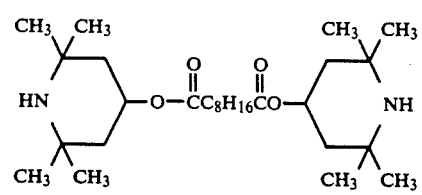

Tradename: Sanol LS-770 (Sankyo);

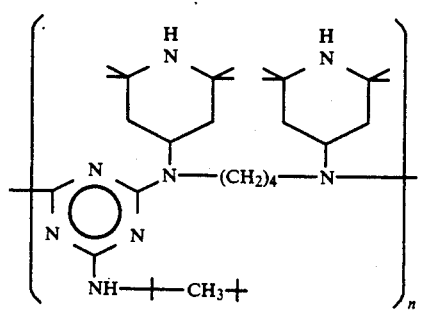

Tradename: Chimassorb 944LD (Ciba-Geigy);

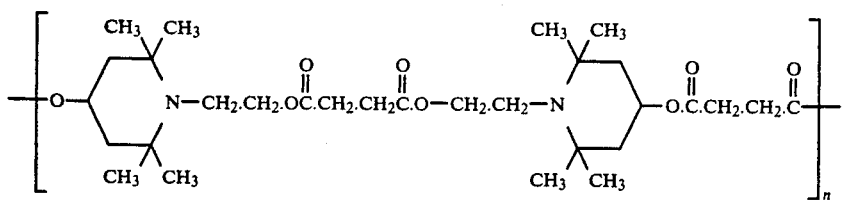

Tradename: Tinuvin 622LD (Ciba-Geigy);

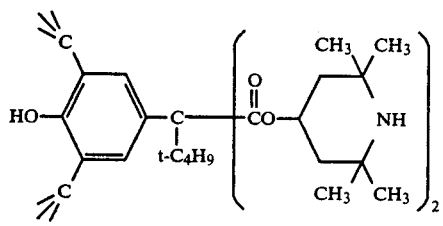

Tradename: Tinuvin 144 (Ciba-Geigy);

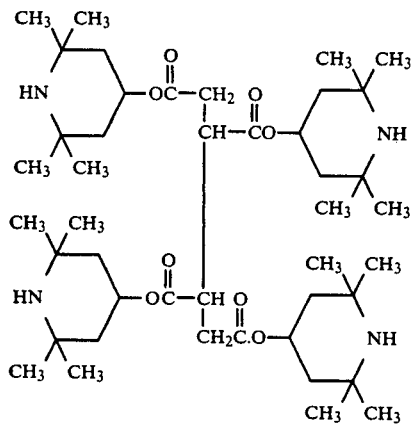

Tradename: Mark LA-57 (Adeka Argus Chemical Co., Ltd.); and

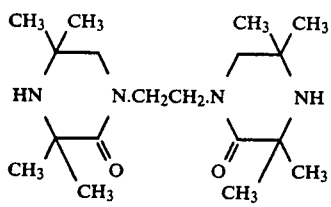

Tradename: Goodrite UV-3034 (Goodrich).

These additives may be added to the solution in the microcapsule. They may be usually employed in an amount ranging from 20%, based on the photochromic material, to the content of said photochromic material.

The abovementioned UV absorber having an effective absorption wavelength of 300 nm or below may be introduced into the capsule wall in the form of fine particles or fine oil droplets formed by dissolving said UV absorber in a solvent.

Furthermore, the present invention relates to an water-base ink composition mainly comprising an aqueous medium, a colorant and a vehicle as major components, wherein said colorant is a microcapsules containing the solution of a photochromic compound, an aqueous emulsion resin is used as said vehicle and the pH value of said ink composition is 5 or above.

Any photochromic compound may be used in the ink composition of the present invention so long as it shows a color change when exposed to light. Examples thereof include spiropyrane, triallylmethane and spirooxazine compounds having a color change mechanism based on ionic cleavage of a bond; stilbene, azobenzene and thioindigo compounds having a color change mechanism based on cis/trans isomerism; salicylidene aniline and dihydroxyanthraquinone compound having a color change mechanism based on tautomeism; dithizon mercury compounds having a color change mechanism based on cis/trans isomerism and tautomerism; and norbornadiene and Fulgide compounds having a color change mechanism based on valence isomerism. Among these compounds, spirooxazine compounds are preferable since they are excellent in coloring/decoloring rate and durability.

The spirooxazine compounds represented by the above structural formulae are still preferable.

When the water-base ink composition is to be prepared, an aqueous emulsion resin capable of giving a pH value of the resulting composition of 5 or above is to be used as the vehicle. Examples thereof include acrylic and urethane homopolymers and copolymers.

More particularly, various acrylic copolymer resins, for example, commercially available ones such as Yodosol A-4100, MR96, LD1009, A-4540, A-7000 and AA-11 (each mfd. by Kanebo), Seikaplain 100,120 and 200 (each mfd. by Dainichi Seika), HD-3 (mfd. by Toa Gosei Kagaku), and Jurymer SEK-301 and FC-30 (each mfd. by Nihon Junyaku).

Various urethane resins including commercially available Superflex 2000 and 200 (each mfd. by Daiichi Kogyo) may be used.

Among these resins, acrylic copolymers are particularly preferable.

The pH value of the ink composition of the present invention may be adjusted to 5 or above by using the abovementioned aqueous emulsion resin. It is particularly preferable to make the ink composition almost neutral, namely, pH 5 to 9 (the pH value may be determined by mixing 10 g of the ink composition with 100 ml of water and stirring at 25° C).

BEST MODE FOR CARRYING OUT THE INVENTION

To further illustrate the present invention, and not by way of limitation, the following Examples and Test Examples will be given.

The light resistance was determined by exposing a sample to sunlight for 9 hours per day in average from June to September. All parts are by weight.

EXAMPLE 1

Example of the production of microencapsulated photochromic material:

Core Material:

34 g of methyl isobutyl ketone (boiling point: 115.9° C., solubility in water at 20° C.: 1.8% by weight) and 3 g of a spirooxazine compound represented by the following formula were mixed together.

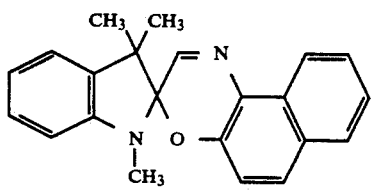

The core material thus obtained was heated to 50° C. and emulsified into 76 ml of a 5% aqueous solution of gelatin (pH 4.75) in such a manner as to give a particle size of 20 μ. Next, 176 ml of a 2% aqueous solution of gum arabic heated to 50° C. was added thereto and the obtained mixture was maintained at 50° C. After adjusting the pH value to 4.75, it was slowly cooled. When the temperature reached 28° C., it was rapidly cooled to 10° C. and 2 ml of a 25% aqueous solution of glutaraldehyde was added thereto. The mixture was stirred at 10° C. for 4 hours, then heated to 40° C. and stirred over night and day.

Thus a solution containing a microencapsulated photochromic material was obtained.

Production example and test example of water-base ink composition

From the solution containing microcapsules thus obtained, the liquid phase was removed until the weight was decreased to 40%. 1 part of the solution containing microcapsules thus obtained was mixed with 1 part of an acrylic copolymer binder (Yodosol A-4100; mfd. by Kanebo NSC) to thereby give an ink composition. The pH value of this ink composition was 5.97.

By using this ink composition, a cotton cloth was subjected to screen printing and dried at 120° C. for 5 minutes.

In addition to this encapsulated ink composition, the light resistances of unencapsulated ink composition and encapsulated one dissolved in a solvent having a high boiling point were tested for comparison. As a result, each sample was deteriorated after the following period:

| | |
|---|---|
| encapsulated ink composition | 24 days; |
| unencapsulated ink composition and | 5 hours; |
| encapsulated ink composition dissolved in high boiling point solvent | 14 hours |

As the high boiling point solvent, SAS-296 (mfd. by Nippon Sekiyu Kagaku) was used.

The light resistance of each sample was tested by exposing it to sunlight for 9 hours per day in average from June to September. Similar results were obtained by a test on a xenone fade tester (XF-15D; mfd. by Shimadzu Seisakusho).

The coloring density at the irradiation of the water-base ink composition of the present invention determined with a densitometer (TR-927; mfd. by Macbeth) was as high as 1.30 in OD value and it gave a deep blue color tone.

Regarding the coloring and decoloring times of this encapsulated ink composition, it showed coloring within 3 seconds when exposed to sunlight and decoloring within 3 seconds, likewise, when placed in the dark.

EXAMPLE 2

Core Material:

39 g of toluene (boiling point: 110.6° C., solubility in water at 20° C.: 0.05% by weight) and 4 g of the same spirooxazine compound as the one used in Example 1 were mixed together. The obtained mixture was encapsulated in the same manner as the one described in Example 1 to thereby give an ink. The pH value of this ink was 5.97. As the result of the light resistance test similar to the one described in Example 1, each sample was deteriorated after the following period:

| | |
|---|---|
| encapsulated ink and | 25 days; |
| unencapsulated ink | 5 hours. |

Regarding the coloring and decoloring times of the encapsulated ink, it showed coloring within 30 seconds when exposed to sunlight and decoloring within 30 seconds when placed in the dark.

EXAMPLE 3

Core Material:

34 g of methyl isobutyl ketone (boiling point: 115.9° C., solubility in water at 20° C.: 1.8% by weight), 3 g of the same spirooxazine compound as the one used in Example 1, 0.5 g of an UV absorber (Viosorb 80 mfd. by Kyodo Yakuhin, effective absorption wavelength: 240–290 nm) and 0.7 g of a secondary antioxidant (Sumilizer P-16; mfd. by Sumitomo Chemical) were mixed together and encapsulated in the same manner as the one described in Example 1 to thereby give an ink. The pH value of the ink was 5.97.

As the result of a light resistance test similar to the one described in Example 1, each sample was deteriorated after the following period:

| | |
|---|---|
| encapsulated ink and | 57 days; |
| unencapsulated ink | 10 hours. |

Regarding the coloring and decoloring times of the encapsulated ink, similar results to those described in Example 1 were obtained.

EXAMPLE 4

Example of the production of microencapsulated photochromic material

Wall Additive:

4.3 g of methyl isobutyl ketone (boiling point: 115.9° C., solubility in water at 20° C.: 1.8% by weight), 0.1 g of an UV absorber (Viosorb 80; mfd. by Kyodo Yakuhin, effective absorption wavelength: 240–290 nm) and 0.03 g of another UV absorber (Sumisorb 400; mfd. by Sumitomo Chemical, effective absorption wavelength: 240–290 nm) were mixed together and heated to 40° C. After adjusting the pH value of the obtained mixture to 4.75, it was emulsified into 10 g of a 5% aqueous solution of gelatin to thereby give emulsion drops of a particle size of 0.5 μ or below in the aqueous gelating solution.

Core Material:

Separately, 34 g of methyl isobutyl ketone (boiling point: 115.9° C., solubility in water at 20° C.: 1.8% by weight), 3 g of the same spirooxazine compound as the one used in Example 1, 0.5 g of an UV absorber (Viosorb 80; mfd. by Kyodo Yakuhin, effective absorption wavelength: 240–290 nm) and 0.7 g of a secondary antioxidant (Sumilizer P-16; mfd. by Sumitomo Chemical) were mixed together. The core material thus obtained was encapsulated in the similar manner to the one described in Example 1. When the temperature of the mixture reached 28° C., it was heated to 33° C. and the abovementioned aqueous gelatin solution was added thereto. The obtained mixture was then slowly cooled to thereby incorporate the wall additive into the gelatin wall. When the mixture reached 28° C., it was rapidly cooled to 10° C. and 2 ml of a 25% aqueous solution of glutaraldehyde was added thereto. After stirring at 10° C. for 4 hours, the mixture was heated to 40° C. and further stirring over night and day. The aqueous solution of microcapsules thus obtained was filtered to thereby give microcapsules.

Production example and test example of water-base ink composition

An ink composition was produced in the same manner as the one described in Example 1, except using the microcapsules obtained above. The pH value of the ink was 5.97. A cotton cloth was subjected to screen printing by using this ink.

The printed matter showed coloring within 3 seconds when exposed to sunlight. Likewise, it showed decoloring within 3 seconds when placed in the dark.

As the result of a light resistance test on this ink composition, it required 69 days (1656 hours) for deterioration, suggesting a good light resistance.

The color density at photoirradiation was determined with a densitometer TR-927. As a result, it showed a high OD value (1.52) and gave a dark blue color tone.

EXAMPLE 5

Core Material:

39 g of toluene (boiling point: 110.6° C., solubility in water at 20° C.: 0.05% by weight) and 4 g of a spirooxazine compound represented by the following formula:

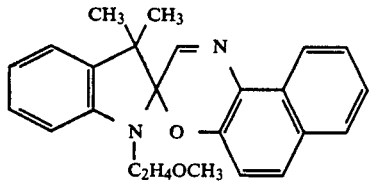

were mixed together. The obtained mixture was encapsulated in the same manner as the one described in Example 1 and the liquid phase was removed until the amount of the product was decreased to 40% by weight of the whole weight. Thus a solution containing microcapsules was obtained.

Next, an ink composition was produced in the same manner as the one described in Example 1, except using the abovementioned solution containing microcapsules. The pH value of this ink was 5.97. By using this ink, a cotton cloth was subjected to screen printing.

The printed matter showed coloring within 3 seconds when exposed to sunlight. It showed decoloring within 30 seconds when placed in the dark.

As the result of a light resistance test on this ink composition, it required 42 days (1008 hours) for deterioration, suggesting a good light resistance.

EXAMPLE 6

Core Material:

34 g of methyl isobutyl ketone (boiling point: 115.9° C., solubility in water at 20° C; 1.8% by weight), 3 g of a spironaphtooxazine compound represented by the following formula:

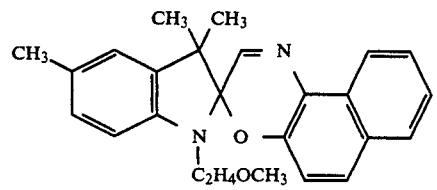

0.5 g of an UV absorber (Viosorb 80; mfd. by Kyodo Yakuhin, effective absorption wavelength: 240–290 nm) and 0.7 g of an antioxidant (Sumilizer P-16; mfd. by Sumitomo Chemical) were mixed together. The obtained mixture was encapsulated in the same manner as the one described in Example 1 to thereby give microcapsules.

Then an ink composition was prepared in the same manner as the one described in Example 1, except using these microcapsules. The pH value of this ink was 5.97. By using this ink, a cotton cloth was subjected to screen printing.

The obtained printed matter showed coloring within 3 seconds when exposed to sunlight. It showed decoloring within 3 seconds when placed in the dark.

As the result of a light resistance test on this ink composition, it required 57 days (1368 hours) for deterioration, suggesting a good light resistance.

EXAMPLE 7

Core Material:

39 g of toluene (b.p.: 110.6° C., solubility in water at 20° C.: 0.05% by weight) and 4 g of a spirooxazine compound represented by the following formula:

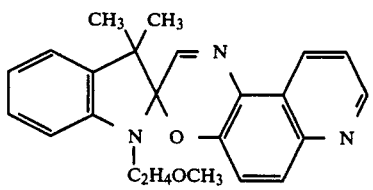

were mixed together. The obtained mixture was encapsulated in the same manner as the one described in Example 1 to thereby give an ink composition. The pH value of this ink was 5.97.

By using this ink composition, a cotton cloth was subjected to screen printing and dried at 120° C. for 5 minutes.

The obtained printed matter showed coloring within 40 seconds when exposed to sunlight. Likewise, it showed decoloring within 40 seconds when placed in the dark.

As the result of a light resistance test on this ink composition, it required 30 days (720 hours) for deterioration, suggesting a good light resistance.

EXAMPLE 8

Microencapsulation was conducted in the same manner as the one described in Example 1, except using each spirooxazine compound and solvent specified in the following Table 1. Then an ink composition was prepared and screen printing on a cotton cloth was conducted by using said ink composition. As Table 1 indicates, each printed matter showed a good light resistance.

Each printed matter showed coloring within a short period of time when exposed to sunlight. It showed decoloring within a short period of time when placed in the dark. This change could be repeatedly observed.

TABLE 1

| | Colorant | Solvent [b.p.] (solubility in water at 20° C.) | Light resistance (time required for deterioration; days) |
|---|---|---|---|
| 8-1 | (structure with CH₃, CH₃, N, O, naphthalene, N-CH₃) | benzene [80.1° C.] (0.2 wt. %) | 24 |
| 8-2 | (structure with CH₃ substituent, CH₃ CH₃, N, O, naphthalene, N-C₂H₄OCH₃) | benzene [80.1° C.] (0.2 wt. %) | 41 |
| 8-3 | (structure with CH₃ CH₃, N, O, quinoline, N-C₂H₄OCH₃) | benzene [80.1° C. (0.2 wt. %) | 30 |
| 8-4 | (structure with CH₃ CH₃, N, O, naphthalene, N-CH₃) | cyclohexane [155.7° C.] (10 wt. %) | 25 |
| 8-5 | (structure with CH₃ CH₃, N, O, benzene ring, N-C₁₂H₂₅(n)) | cyclohexane [155.7° C.] (10 wt. %) | 25 |
| 8-6 | A 1:1 mixture of (structure with CH₃, CH₃ substituents, CH₃ CH₃, N, O, naphthalene, N-C₂H₄OC₂H₅) | trichloroethylene [87.2° C.] (0.1 wt. %) | 42 | and

TABLE 1-continued

| | Colorant | Solvent [b.p.] (solubility in water at 20° C.) | Light resistance (time required for deterioration; days) |
|---|---|---|---|
| | 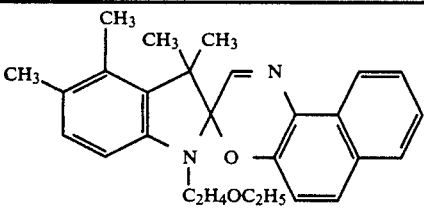 | | |
| 8-7 | 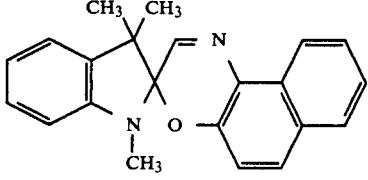 | butyl acetate [126.1° C.] (1.0 wt. %) | 20 |
| 8-8 | 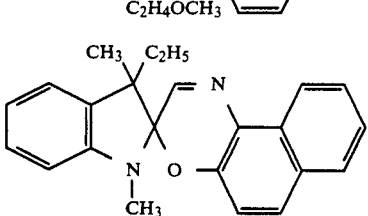 | butyl acetate [126.1° C.] (1.0 wt. %) | 24 |
| 8-9 | 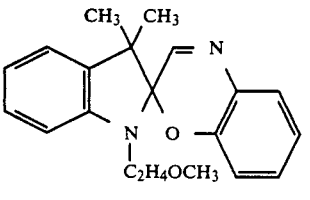 | 1,1,2,2-tetrachloroethane [121.20° C.] (0.1 wt. %) | 20 |
| 8-10 | 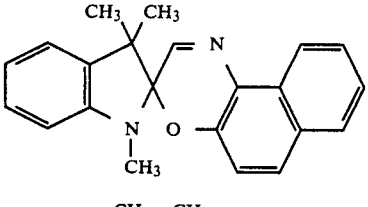 | 1,1,2,2-tetrachloroethane [121.20° C.] (0.1 wt. %) | 25 |
| 8-11 | | tetrachloroethane [129.2° C.] (0.015 wt. %) | 20 |
| 8-12 | 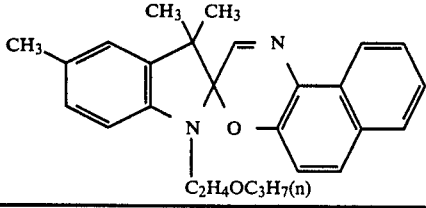 | methylene chloride [40.4° C.] (2.0 wt. %) | 42 |

EXAMPLE 9

Example of the production of microencapsulated photochromic material

The same core material as the one used in Example 5 was heated to 50° C. and emulsified into 80 ml of a 5% aqueous solution of gelatin (pH 4.75) in such a manner as to give a particle size of 20 μ. Next, 185 ml of a 2% aqueous solution of gum arabic heated to 50° C. was added thereto. The pH value of the mixture was adjusted to 4.75 while maintaining the material temperature to 50° C. Then it was slowly cooled. When the material temperature reached 28° C., it was cooled to 10° C. and 5 ml of a 37% aqueous solution of formalin was added thereto. After stirring at 10° C. for 4 hours, it was heated to 40° C. and stirred over night and day.

Thus a solution containing a microencapsulated photochromic material was obtained.

Production example and test example of water-base ink composition

From the microcapsule-containing solution thus obtained, the liquid phase was removed until the amount was decreased to 40% by weight. 1 part of the microcapsule-containing solution thus obtained was mixed with 1 part of an acrylic copolymer binder emulsion (Yodosol A-4100: mfd. by Kanebo NSC) to thereby give an ink composition. The pH value of this ink was 5.97. A cotton cloth was subjected to screen printing by using this ink composition and dried a 120° C. for 5 minutes.

The printed matter thus obtained showed coloring within 30 seconds when exposed to sunlight. It showed decoloring within 30 seconds when placed in the dark.

As the result of a light resistance test on this ink composition, it required 42 days (1008 hours) for deterioration, suggesting a good light resistance.

The color density of this ink composition at photoirradiation was determined with a densitometer TR927 (mfd. by Macbeth). As a result, it showed a high OD value of 1.50 and gave a dark blue color tone.

EXAMPLE 10

Production example of microencapsulated photochromic material

The same core material as the one used in Example 6 was heated to 60° C. and emulsified into a solution of 25 g of acid-treated gelatin in 440 g of water. Next, 50 g of a 5% aqueous solution of carboxymethylcellulose (degree of etherization and average degree of polymerization: 150) was added thereto. The pH value of the obtained mixture was adjusted to 5.5 to thereby form a coacervate. The resulting coacervate was cooled to 10° C. and 10 g of 25% glutaraldehyde was added thereto. Then the pH value of the obtained mixture was adjusted to 7.0 with 10% caustic soda.

Thus a solution containing a microencapsulated photochromic material was obtained.

Production example and test example of water-base ink composition

From the microcapsule-containing solution thus obtained, the liquid phase was removed until the amount of the aqueous solution was decreased to 40% by weight. An ink was produced in the same manner as the one described in Example 1 except using this microcapsulecontaining solution. The pH value of this ink was 5.97. As the result of a light resistance test, a printed matter obtained by using this ink composition required 69 days. Similar to Example 1, this ink composition gave good results regarding the coloring and decoloring times.

The color density of the printed matter at photoirradiation determined with a densitometer TR-927 (mfd. by Macbeth) was 1.25 in OD value and it showed a dark blue color tone.

EXAMPLE 11

The microencapsulation procedure of Example 1 was repeated except using each spirooxazine compound of the present invention specified in the following Table 2 to thereby give an ink composition. Table 2 shows the results of a light resistance test on printed matters on cotton cloth obtained by using these ink compositions. Thus each one showed a good light resistance.

These printed matters showed coloring when exposed to sunlight and decoloring when placed in the dark. This change could be observed repeatedly. Each one showed a high coloring density at photoirradiation.

TABLE 2

| | Spirooxazine compound | Light resistance (time required for deterioration; days) |
|---|---|---|
| 11-1 | [structure with CH3, CH3, CH3, OCH3, N, N, O, C2H4OCH3] | 40 |
| 11-2 | [structure with CH3, CH3, N, N, O, C2H4OCH3] | 31 |
| 11-3 | [structure with CH3, CH3, N, N, O, C12H25(n)] | 26 |

TABLE 2-continued

| | Spirooxazine compound | Light resistance (time required for deterioration; days) |
|---|---|---|
| 11-4 | [structure: 1,3,3-trimethyl with N-CH3 indoline spiro naphthoxazine, with C2H5 group] | 20 |
| 11-5 | [structure: 3,3-dimethyl indoline with N-C2H4OCH3, spiro benzoxazine] | 25 |
| 11-6 | [structure: 5-CH3, 3,3-dimethyl indoline with N-C2H4OC3H7(n), spiro naphthoxazine] | 43 |
| 11-7 | A 1:1 mixture of [structure: 5,6-di-CH3, 3,3-dimethyl indoline with N-C2H4OC2H5, spiro naphthoxazine] and [structure: 4,5 or 5,7-di-CH3 with extra 7-CH3, 3,3-dimethyl indoline with N-C2H4OC2H5, spiro naphthoxazine] | 42 |

EXAMPLE 12

An ink composition was produced in the same manner as the one described in Example 1 except using the same core material as the one employed in Example 5 and 1 part of Yodosol MR96 (acrylic copolymer resin aqueous emulsion; mfd. by Kanebo NSC). The pH value of this ink composition was 6.15. By using this ink composition, a cotton cloth was subjected to screen printing and dried at 120° for 5 minutes.

The printed matter on the cotton cloth thus obtained showed coloring within 30 seconds when exposed to sunlight. It showed decoloring within 30 seconds when placed in the dark.

As the result of a light resistance test on the printed matter obtained by using said ink composition, it required 42 days (1008 hours) for deterioration, suggesting a good light resistance.

EXAMPLE 13

An ink composition was produced in the same manner as the one described in Example 1 except 1 part of Superflex E-2000 (urethane resin emulsion; mfd. by Daiichi Kogyo Seiyaku) was employed as the vehicle. The pH value of this ink composition was 5.16. By using this ink composition, a cotton cloth was subjected to screen printing and dried at 120° for 5 minutes.

The printed matter on the cotton cloth obtained by using this ink composition showed coloring within 3 seconds when exposed to sunlight. It showed decoloring within 3 seconds when placed in the dark.

As the result of a light resistance test on the printed matter, it required 25 days (600 hours) for deterioration, suggesting a good light resistance.

EXAMPLE 14

An ink composition was produced in the same manner as the one described in Example 1 except 1 part of Jurymar SEK-301 (acrylic resin emulsion; mfd. by Nihon Junyaku) as the vehicle. The pH value of this ink composition was 8.00. Next, a cotton cloth was subjected to screen printing by using this ink composition and dried at 120° for 5 minutes.

The printed matter on the cotton cloth obtained by using this ink composition showed coloring within 10 seconds when exposed to sunlight. It showed decoloring within 10 seconds when placed in the dark.

As the result of a light resistance test on the printed matter obtained by using said ink composition, it required 24 days (576 hours), suggesting a good light resistance.

EXAMPLE 15

An ink composition was produced in the same manner as the one described in Example 1 except 1 part of Jurimar FC-30 (acrylic copolymer resin; mfd. by Nihon Junyaku) as the vehicle. The pH value of this ink composition was 8.69. Next, a cotton cloth was subjected to screen printing with the use of this ink composition and dried at 120° for 5 minutes.

The printed matter on the cotton cloth obtained by using said ink composition showed coloring within 3 seconds when exposed to sunlight. It showed decoloring within 3 seconds when placed in the dark.

As the result of a light resistance test on the printed matter obtained by using said ink composition, it required 24 days (576 hours) for deterioration, suggesting a good light resistance.

EXAMPLE 16

Microencapsulation was conducted in the same manner as the one described in Example 1 except using each spirooxazine compound, vehicle and aqueous emulsion resin specified in the following Table 3 to thereby give an ink composition. Printed matters on cotton cloth obtained by using these ink compositions showed each a good light resistance, as Table 3 indicates.

Each printed matter showed coloring when exposed to sunlight and decoloring when placed in the dark. This change could be repeatedly observed.

TABLE 3

| | Spirooxazine compound | Aqueous emulsion resin | Light resistance (time required for deterioration; days) |
|---|---|---|---|
| 16-1 | [structure with CH₃, CH₃, N-CH₃, O, naphthyl] | Yodosol A-4540 (acrylic copolymer resin: mfd. by Kanebo NSC) | 24 |
| 16-2 | [structure with CH₃ on benzene, CH₃, CH₃, N-C₂H₄OCH₃, O, naphthyl] | Yodosol A-7000 (acrylic copolymer resin: mfd. by Kanebo NSC) | 40 |
| 16-3 | [structure with CH₃, CH₃, N-C₂H₄OCH₃, O, quinoline] | Yodosol A-11 (acrylic copolymer resin: mfd. by Kanebo NSC) | 30 |
| 16-4 | [structure with CH₃, CH₃, N-CH₃, O, naphthyl] | Superflex 200 (urethane resin: mfd. by Daiichi Kogyo Seiyaku) | 24 |
| 16-5 | [structure with CH₃, CH₃, N-C₁₂H₂₅(n), O, phenyl] | Superflex 200 (urethane resin: mfd. by Daiichi Kogyo Seiyaku) | 25 |

TABLE 3-continued

| | Spirooxazine compound | Aqueous emulsion resin | Light resistance (time required for deterioration; days) |
|---|---|---|---|
| 16-6 | Structure with CH₃, C₂H₅ substituents on indoline (N-CH₃) fused to naphthooxazine | Superflex 200 (urethane resin: mfd. by Daiichi Kogyo Seiyaku) | 20 |
| 16-7 | Structure with CH₃, CH₃ substituents on indoline (N-C₂H₄OCH₃) fused to benzooxazine | Yodosol (acrylic copolymer resin: mfd. by Kanebo NSC) | 26 |
| 16-8 | Structure with CH₃, CH₃ substituents on indoline (N-CH₃) fused to naphthooxazine | Yodosol (acrylic copolymer resin: mfd. by Kanebo NSC) | 20 |

EXAMPLE 17

An ink composition was prepared in the same manner as the one described in Example 6 except that the Sumilizer P-16 employed as an antioxidant in the core material was substituted with 0.7 g of Yoshinox BHT (mfd. by Yoshitomi Seiyaku). The pH value of this ink was 5.97.

Similar to Example 6, a cotton cloth was subjected to screen printing by using said ink composition. As the result of a light resistance test, the obtained printed matter required 59 days (1416 hours) for deterioration.

EXAMPLE 18

An ink composition was produced in the same manner as the one described in Example 6 except that a hindered amine photostabilizer (Sanol LS-2626: mfd. by Sankyo) was added to the composition of the core material. The pH value of this ink was 5.97.

Similar to Example 6, a cotton cloth was subjected to screen printing by using said ink composition. As the result of a light resistance test, the obtained printed matter required 68 days (1632 hours) for deterioration, showing a good light resistance.

EXAMPLES 19 and 20

Production of microencapsulated photochromic material 34 g of the same solvent namely, methyl isobutyl ketone and 3 g spironaphthooxazine compound as the ones used in Example were mixed together with the additives specified in the following Table 4.

Each core material thus obtained was heated to 60° and emulsified into a solution of 25 g of acid-treated gelatin in 440 g of water. Next, 50 g of a 5% aqueous solution of carboxymethylcellulose (degree of etherization, average degree of polymerization: 150) was added thereto. The pH value of the obtained mixture was adjusted to 5.5 to thereby form a coacervate. Then the obtained coacervate was cooled to 10° C. and 10 g of 25% glutaraldehyde was added thereto. Further the pH value of the mixture was adjusted to 7.0 with 10% caustic soda.

Thus a solution containing a microencapsulated photochromic material was obtained.

Production example and test example of water-base ink composition

From the microcapsule-containing solution thus obtained, the liquid phase was removed until the amount of the aqueous solution was decreased to 40% by weight. 1 part of the microcapsule-containing solution thus obtained was treated in the same manner as the one described in Example 1 to thereby give an ink. Each ink showed a pH value of 5.97. The light resistances and coloring densities of these inks were evaluated by the same methods as those described in Example 1. Table 4 shows the results.

TABLE 4

| Ex. No. | UV Absorber (g) | Anti-oxidant (g) | Hindered Amine Stabilizer (g) | Light Resistance (time required for deterioration; days) | OD |
|---|---|---|---|---|---|
| 19 | — | Irganox (Ciba-Geigy) 0.7 | Tinuvin 622LD (Ciba-Geigy) 0.5 | 71 | 1.25 |
| 20 | Viosorb 80 (Kyodo Yakuhin) 0.4 | Sumilizer P-16 (Sumitomo Chemical) 0.7 | Sanol LS-770 (Sankyo Yakuhin) 0.6 | 73 | 1.24 |
| 21 | Viosorb 80 (Kyodo Yakuhin) 0.3 | Sumilizer P-16 (Sumitomo Chemical) 0.7 | Tinuvin 144 0.5 | 74 | 1.25 |

EXAMPLE 22

Microencapsulation was conducted in the same manner as the one described in Example 1 except using each spirooxazine compound and additive specified in the following Table 5. Each ink composition thus obtained was likewise subjected to screen printing on a cotton cloth. As Table 5 indicates, each printed matter showed a good light resistance in a light resistance test.

These printed matters showed coloring when exposed to sunlight and decoloring when placed in the dark. This change could be observed repeatedly.

TABLE 5

| | Colorant | UV absorber | Antioxidant | Hindered amine stabilizer | Light resistance (time required for deterioration; days) |
|---|---|---|---|---|---|
| 22-1 | 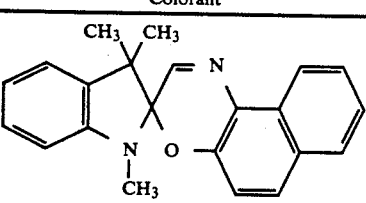 | Viosorb 80 0.3 g | Sumilizer P-16 0.3 g | Sanol LS-2626 0.5 g | 42 |
| 22-2 | 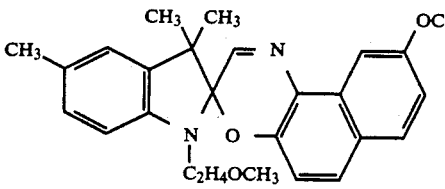 | Viosorb 80 0.3 g | Sumilizer P-16 0.3 g | Sanol LS-2626 0.5 g | 70 |
| 22-3 | 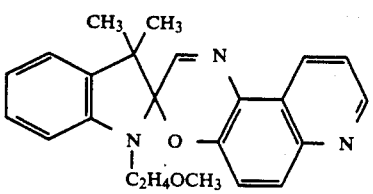 | Viosorb 80 0.3 g | Sumilizer P-16 0.3 g | Sanol LS-2626 0.5 g | 75 |
| 22-4 | 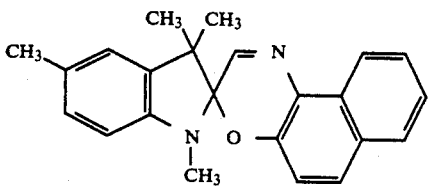 | Viosorb 80 0.3 g | Sumilizer P-16 0.3 g | Sanol LS-2626 0.5 g | 38 |
| 22-5 | 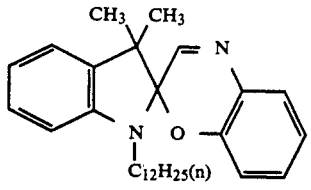 | Viosorb 80 0.3 g | Sumilizer P-16 0.3 g | Sanol LS-2626 0.5 g | 40 |
| 22-6 | A 1:1 mixture of 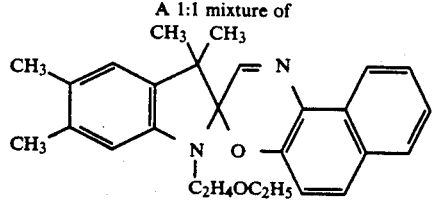 and 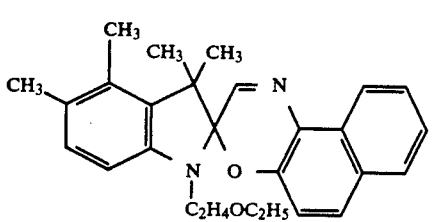 | Viosorb 80 0.4 g | — | Tinuvin 144 0.6 g | 68 |

TABLE 5-continued

| | Colorant | UV absorber | Antioxidant | Hindered amine stabilizer | Light resistance (time required for deterioration; days) |
|---|---|---|---|---|---|
| 22-7 | [structure: indoline with CH3, CH3, N-CH3, linked =N to naphthalene with OCH3] | Viosorb 80 0.4 g | — | Tinuvin 144 0.6 g | 42 |
| 22-8 | [structure: indoline with CH3, CH3, N-C2H4OCH3, linked =N to quinoline] | Viosorb 80 0.4 g | Irganox 1010 0.5 g | Tinuvin 622LD 0.5 g | 73 |
| 22-9 | [structure: indoline with CH3, C2H5, N-CH3, linked =N to naphthalene] | Viosorb 80 0.4 g | Irganox 1010 0.5 g | Tinuvin 622LD 0.5 g | 45 |
| 22-10 | [structure: indoline with CH3, CH3, N-C2H4OCH3, linked =N to phenyl] | Viosorb 80 0.4 g | Yoshinox BHT 0.5 g | Sanol LS-2626 0.6 g | 71 |
| 22-11 | [structure: dimethyl-substituted indoline with CH3, CH3, N-CH3, linked =N to naphthalene] | — | Yoshinox BHT 0.5 g | Sanol LS-2626 0.6 g | 42 |
| 22-11 | [structure: methyl-substituted indoline with CH3, CH3, N-C2H4OC3H7(n), linked =N to naphthalene] | — | Yoshinox BHT 0.5 g | Sanol LS-2626 0.6 g | 71 |

INDUSTRIAL APPLICABILITY

The microencapsulated photochromic material according to the present invention can be readily produced, which makes the production thereof easy and lowers its production cost. The durability of the photochromic material of the present invention can be further improved by adding an UV absorber and an antioxidant into the capsule wall at such an amount that the light resistance, coloring/decoloring rate and keeping quality of the photochromic material can be extremely improved without showing any undesirable effect on coloring. Thus the microencapsulated photochromic material of the present invention is widely available in, for example, coatings, clothes, toys, stationary goods, sport goods, cosmetics, sunglasses, window light-regulators, photorecording materials, color displays and monitors for products concerning light resistance.

We claim:

1. A microencapsulated photochromic material comprising an effective amount of a spirooxazine compound in microcapsules in the form of a solution, said compound being of the Formula

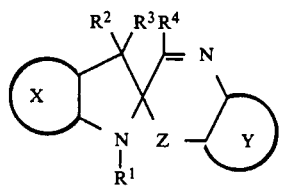

[I]

wherein $R^1$, $R^2$ and $R^3$ each represent an optionally substituted alkyl group, an optionally substituted alkenyl group, a cycloalkyl group, or an aryl group; $R^2$ and $R^3$ may bind to each other to form a ring; $R^4$ represents a hydrogen atom or an alkyl group having 1 to 5 carbon atoms; $R^1$ optionally contains another spirooxazine ring via an alkylene or arylene group, X and Y each represent an optionally substituted hydrocarbon aromatic ring or heterocyclic aromatic ring; and Z represents an oxygen atom or a sulfur atom.

2. A microencapsulated photochromic material claimed in claim 1, wherein said solution contains a solvent having a boiling point of 40 to 160° C. and a solubility in water at 20° C. of 15% by weight or below.

3. A microencapsulated photochromic material claimed in claim 1, wherein said microcapsules consist of a crosslinked gelatin film agent.

4. A microencapsulated photochromic material claimed in claim 1, wherein said solution contains an UV absorber having an effective absorption wavelength of 300 nm or below.

5. A microencapsulated photochromic material claimed in claim 1, wherein said solution contains an antioxidant.

6. A microencapsulated photochromic material claimed in claim 1, wherein said solution contained a hindered amine photostabilizer.

7. A process for the production of a microencapsulated photochromic material which comprises dissolving a spirooxazine compound in a solvent, which has a boiling point of 40 to 160° C. and a solubility in water at 20° C. of 15% by weight or below, microencapsulating the solution thus obtained and vaporizing most of the solvent from the capsules during or after the above procedure, while leaving an effective amount of said spirooxazine compound and a trace amount of said solvent therein, said spirooxazine compound comprising

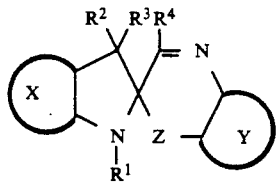

[I]

wherein $R^1$, $R^2$ and $R^3$ each represent an optionally substituted alkyl group, an optionally substituted alkenyl group, a cycloalkyl group, or an aryl group; $R^2$ and $R^3$ may bind to each other to form a ring; $R^4$ represents a hydrogen atom or an alkyl group having 1 to 5 carbon atoms; $R^1$ optionally contains another spirooxazine ring via an alkylene or arylene group, X and Y each represent an optionally substituted hydrocarbon aromatic ring or heterocyclic aromatic ring; and Z represents an oxygen atom or a sulfur atom.

8. A water-base ink composition comprising an aqueous medium, a colorant and a vehicle as major components, wherein said colorant is obtained by microencapsulating an effective amount of a spirooxazine compound solution, an aqueous emulsion resin is used as said vehicle and the pH value of said ink composition is adjusted to 5 or above, said spirooxazine compound comprising

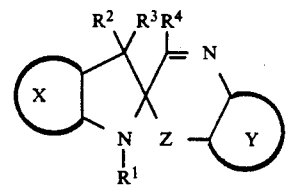

[I]

wherein $R^1$, $R^2$ and $R^3$ each represent an optionally substituted alkyl group, an optionally substituted alkenyl group, a cycloalkyl group, or an aryl group; $R^2$ and $R^3$ may bind to each other to form a ring; $R^4$ represents a hydrogen atom or an alkyl group having 1 to 5 carbon atoms; $R^1$ optionally contains another spirooxazine ring via an alkylene or arylene group, X and Y each represent an optionally substituted hydrocarbon aromatic ring or heterocyclic aromatic ring; and Z represents an oxygen atom or a sulfur atom.

9. A process for the production of the microencapsulated photochromic material of claim 1 wherein UV absorber, an antioxidant, or mixtures thereof are added to said solution at the dissolution of said photochromic compound in said solvent.

10. A process for the production of a microencapsulated photochromic material claimed in claim 9, wherein fine particles of said UV absorber or fine oil droplets of said UV absorber dissolved in a solvent are incorporated into microcapsule walls.

* * * * *